(12) United States Patent
Sim

(10) Patent No.: US 10,919,536 B2
(45) Date of Patent: Feb. 16, 2021

(54) EMERGENCY CONTROL DEVICE FOR VEHICLE

(71) Applicant: MANDO CORPORATION, Pyeongtaek-si (KR)

(72) Inventor: Sang Kyun Sim, Anyang-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 16/221,127

(22) Filed: Dec. 14, 2018

(65) Prior Publication Data

US 2020/0122734 A1 Apr. 23, 2020

(30) Foreign Application Priority Data

Oct. 18, 2018 (KR) .................. 10-2018-0124330

(51) Int. Cl.

| G08B 23/00 | (2006.01) |
|---|---|
| B60W 40/09 | (2012.01) |
| G06K 9/00 | (2006.01) |
| G05D 1/00 | (2006.01) |
| B60W 40/08 | (2012.01) |

(52) U.S. Cl.
CPC .......... *B60W 40/09* (2013.01); *G05D 1/0061* (2013.01); *G06K 9/00845* (2013.01); *B60W 2040/0818* (2013.01); *G05D 2201/0213* (2013.01)

(58) Field of Classification Search
CPC ......... B60W 40/09; B60W 2040/0818; B60W 2201/0213; G05D 1/0061; G06K 9/00845
USPC ........................................................ 340/576
See application file for complete search history.

(56) References Cited

U.S. PATENT DOCUMENTS

| 7,719,431 | B2* | 5/2010 | Bolourchi | B60K 28/066 340/576 |
|---|---|---|---|---|
| 8,725,311 | B1* | 5/2014 | Breed | A61B 5/0507 701/1 |
| 9,007,198 | B2* | 4/2015 | Gunaratne | B60Q 9/008 340/439 |
| 2004/0158377 | A1* | 8/2004 | Matsumoto | B62D 6/003 701/48 |
| 2005/0030184 | A1* | 2/2005 | Victor | B60K 28/06 340/576 |
| 2007/0182529 | A1* | 8/2007 | Dobler | B60K 28/06 340/438 |

(Continued)

FOREIGN PATENT DOCUMENTS

| JP | 2014-532930 A | 12/2014 |
|---|---|---|
| KR | 10-2014-0147233 A | 12/2014 |
| KR | 10-2017-0130632 A | 11/2017 |

*Primary Examiner* — Kerri L McNally
*Assistant Examiner* — Thang D Tran
(74) *Attorney, Agent, or Firm* — Morgan, Lewis & Bockius LLP

(57) ABSTRACT

The present invention relates to an emergency control device for a vehicle. The emergency control device for a vehicle according to the present invention includes a sensor configured to measure an area inside or outside the vehicle, a processor configured to process data collected by the sensor, and a controller configured to control the vehicle by reflecting the data processed by the processor, wherein the sensor detects whether a driver is inattentive, the processor determines the level of inattentiveness of the driver according to the detected state of the driver, and the controller controls the vehicle according to the level of inattentiveness of the driver.

22 Claims, 3 Drawing Sheets

(56) References Cited

U.S. PATENT DOCUMENTS

| | | | |
|---|---|---|---|
| 2007/0229693 A1* | 10/2007 | Kameyama | G06T 5/00 348/333.01 |
| 2010/0131148 A1* | 5/2010 | Camhi | B60W 40/09 701/31.4 |
| 2013/0106844 A1* | 5/2013 | Hong | G06T 15/04 345/419 |
| 2014/0142798 A1* | 5/2014 | Guarnizo Martinez | B60W 30/09 701/23 |
| 2014/0172467 A1* | 6/2014 | He | B60K 28/06 705/4 |
| 2014/0276090 A1* | 9/2014 | Breed | A61B 5/14546 600/473 |
| 2015/0025917 A1* | 1/2015 | Stempora | G06Q 40/08 705/4 |
| 2015/0102929 A1 | 4/2015 | Grinenval et al. | |
| 2015/0206434 A1* | 7/2015 | Shimotani | G08G 1/161 701/36 |
| 2015/0239477 A1* | 8/2015 | Kitagawa | G01C 21/34 701/1 |
| 2015/0254955 A1* | 9/2015 | Fields | G08B 21/02 705/4 |
| 2015/0310145 A1* | 10/2015 | Nica | B60W 40/08 703/8 |
| 2016/0001781 A1* | 1/2016 | Fung | B60W 40/08 701/36 |
| 2016/0029940 A1* | 2/2016 | Iizuka | B60W 50/12 701/23 |
| 2016/0071418 A1* | 3/2016 | Oshida | G08G 1/22 701/23 |
| 2016/0167675 A1* | 6/2016 | Peng | B60W 50/14 340/576 |
| 2016/0267335 A1* | 9/2016 | Hampiholi | G06F 3/013 |
| 2016/0362113 A1* | 12/2016 | Takaso | B60W 10/18 |
| 2017/0120749 A1* | 5/2017 | Dias | B60K 28/066 |
| 2017/0168483 A1* | 6/2017 | Knorr | B60W 50/14 |
| 2017/0267169 A1* | 9/2017 | Fleurence | B60Q 3/85 |
| 2017/0305349 A1* | 10/2017 | Naboulsi | B60R 1/025 |
| 2017/0332347 A1* | 11/2017 | Boss | H04W 24/08 |
| 2017/0355379 A1* | 12/2017 | Hamaguchi | B60K 28/066 |
| 2017/0364070 A1* | 12/2017 | Oba | B60W 50/08 |
| 2018/0122259 A1* | 5/2018 | Arquero | G09B 19/167 |
| 2018/0189681 A1* | 7/2018 | Harrivel | G06F 3/011 |
| 2018/0194280 A1* | 7/2018 | Shibata | G01C 21/3658 |
| 2018/0297603 A1* | 10/2018 | Jun | G05D 1/0061 |
| 2018/0326850 A1* | 11/2018 | Recktenwald | B60K 37/06 |
| 2019/0038204 A1* | 2/2019 | Beck | A61B 5/18 |
| 2019/0039618 A1* | 2/2019 | Mori | B60W 30/18 |
| 2019/0236386 A1* | 8/2019 | Yu | A61B 5/0077 |
| 2019/0236387 A1* | 8/2019 | Firik | H04M 1/72577 |
| 2019/0310629 A1* | 10/2019 | Taveira | G05D 1/0061 |
| 2019/0310630 A1* | 10/2019 | Taveira | G05D 1/0061 |
| 2019/0324451 A1* | 10/2019 | Obata | B60W 40/09 |
| 2020/0012872 A1* | 1/2020 | Autran | G06K 9/00375 |
| 2020/0086882 A1* | 3/2020 | Kodali | B60W 40/09 |

* cited by examiner

EMERGENCY CONTROL DEVICE FOR VEHICLE

CROSS-REFERENCE TO RELATED APPLICATION

Pursuant to 35 U.S.C. § 119 (a), this application claims the benefit of earlier filing date and right of priority to Korean Patent Application No. 10-2018-0124330, filed on Oct. 18, 2018, the contents of which are hereby incorporated herein by reference in its entirety.

BACKGROUND

1. Field of the Invention

The present invention relates to an emergency control device for a vehicle.

2. Discussion of Related Art

Generally, to assist a driver in driving safely, various driving assist systems are mounted in a vehicle. Such driving assist systems are safety devices which detect a collision risk using a high-tech sensor, warn the driver of danger of accident, and decrease the speed of the vehicle or perform emergency braking of the vehicle to avoid a head-on collision or broadside collision.

However, the conventional driving assist systems have a problem in that they fail to reflect all of various driving conditions. A lack of sleep, monotonous road conditions, use of other devices in the vehicle, or health-related conditions may cause the driver to be drowsy or become less attentive and thus cause the driver to become inattentive.

In addition, in the state in which the driver is inattentive, it is highly likely that a danger will be caused to the driver as well as a fellow passenger of the vehicle, a passenger of another vehicle, and a pedestrian due to drowsiness and a decrease in a response speed of the driver.

Therefore, overall improvements are required regarding such issues.

PRIOR ART DOCUMENT

Patent Document (Patent Document 1) Korean Patent Registration No. 10-1511858 (Date of Publication: Apr. 7, 2015)

SUMMARY OF THE INVENTION

The present invention is directed to providing an emergency control device for a vehicle capable of controlling the vehicle by reflecting an inattentive state of a driver.

In particular, the present invention is directed to providing an emergency control device for a vehicle capable of accurately determining a level of inattentiveness of a driver by using various sensors and controlling the vehicle according to the determined level of inattentiveness of the driver.

The present invention is also directed to providing an emergency control device for a vehicle capable of adjusting a degree to which a driver is assisted through a driver assist environment according to the level of inattentiveness of the driver.

The present invention is also directed to providing an emergency control device for a vehicle capable of safely decelerating and stopping the vehicle even when a driver is determined as being unable to drive any more.

To achieve the above objects, an emergency control device for a vehicle according to the present invention includes a sensor configured to measure an area inside or outside the vehicle, a processor configured to process data collected by the sensor, and a controller configured to control the vehicle by reflecting the data processed by the processor, wherein the sensor detects whether a state of the driver, the processor determines the level of inattentiveness of the driver based on the state of the driver, and the controller controls the vehicle according to the level of inattentiveness of the driver.

In this case, the sensor may detect the state of the driver by directly measuring a state of the driver.

Alternatively, the sensor may detect inattentiveness of the driver indirectly by using a traveling state of the vehicle.

In addition, the processor may apply different levels of inattentiveness for the case in which inattentiveness of the driver is detected by directly measuring a state of the driver and the case in which inattentiveness of the driver is detected indirectly by using a traveling state of the vehicle.

Here, the sensor may measure direct motion of the driver.

Alternatively, the sensor may measure whether the vehicle keeps traveling in the same lane, a traveling pattern of the vehicle, or a lateral acceleration of the vehicle.

In this case, when the level of inattentiveness of the driver exceeds a certain level, the controller may control the vehicle to assist the driver.

In addition, when the level of inattentiveness of the driver exceeds the certain level, the controller may automatically determine whether to assist the driver.

In this case, the controller may control driver assist conditions to be different according to the level of inattentiveness of the driver.

The controller may warn of a lane departure, keep the lane, perform emergency braking of the vehicle, automatically drive the vehicle at a constant speed, or control the vehicle until a speed of the vehicle reaches a certain speed.

In this case, the controller may control the vehicle by advancing the time at which driver assist begins and increasing the degree of driver assist as the level of inattentiveness of the driver increases.

Alternatively, when inattentiveness of the driver is detected for a certain amount of time, the controller may determine that a threshold condition has been satisfied and control the vehicle to decelerate or to decelerate and then stop.

In this case, the controller may determine whether the threshold condition has been satisfied on the basis of at least one of the number of lane departures, the hands-off time, a lateral acceleration equal to or greater than a specific numerical value, a radius of curvature equal to or less than a specific numerical value, and the lane departure time.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
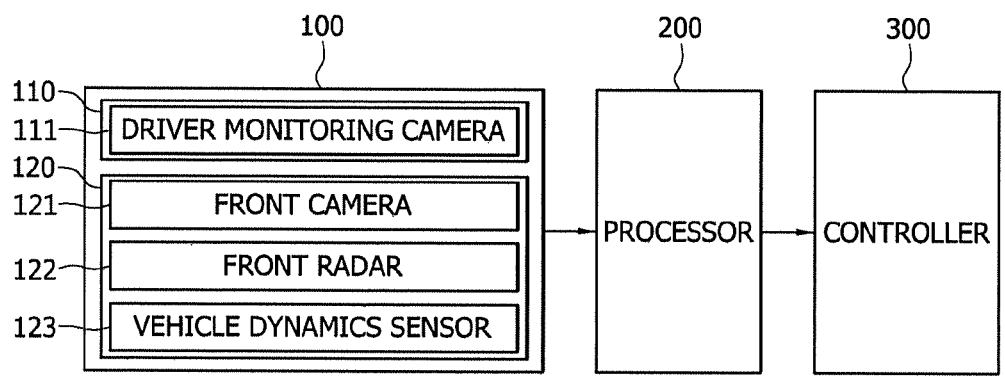
FIG. 1 is a block diagram of an emergency control device for a vehicle according to the present invention.

Hereinafter, exemplary embodiments of the present invention will be described in detail with reference to the accompanying drawings so that one of ordinary skill in the art to which the present invention pertains can easily practice the present invention. The present invention may be implemented in various different forms and is not limited to the embodiments described herein. To clearly describe the present invention, parts unrelated to the description have been omitted from the drawings, and like elements are denoted by like reference numerals throughout.

In the specification, terms such as "include" or "have" are for designating the existence of features, numbers, steps, operations, elements, parts or combinations thereof, and should not be understood as precluding the existence or the possibility of adding one or more features, numbers, steps, operations, elements, parts, or combinations thereof. In addition, when it is said that a part such as a layer, a film, an area, or a plate is placed "on" another part, this includes a case in which another part is disposed therebetween as well as a case in which the part is placed "directly above" the other part. Conversely, when it is said that a part such as a layer, a film, an area, or a plate is placed "under" another part, this includes a case in which another part is disposed therebetween as well as a case in which the part is placed "directly under" the other part.

Figure 2:
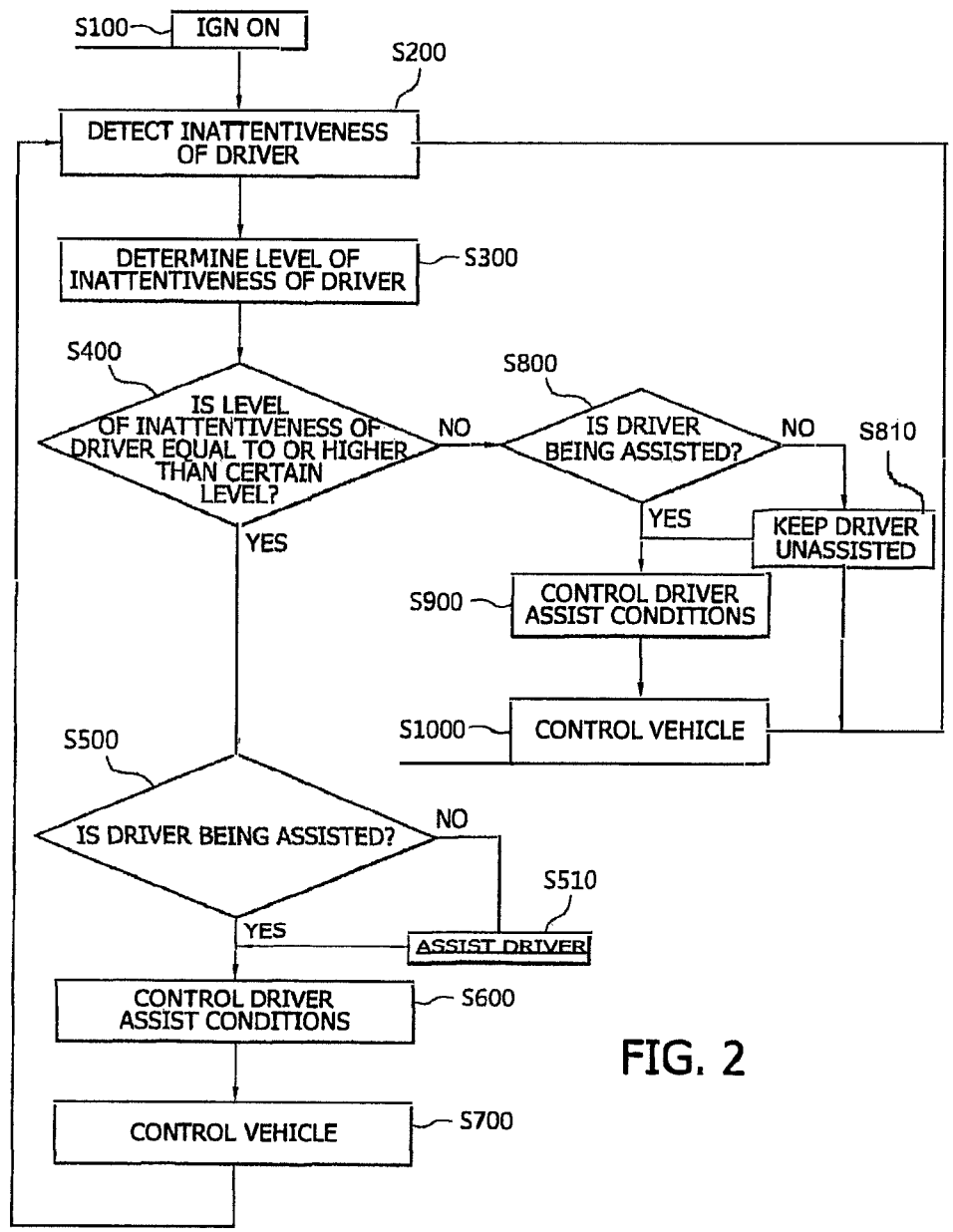
FIG. 2 is a flowchart illustrating an operation of the emergency control device for a vehicle according to the present invention.
Figure 3:
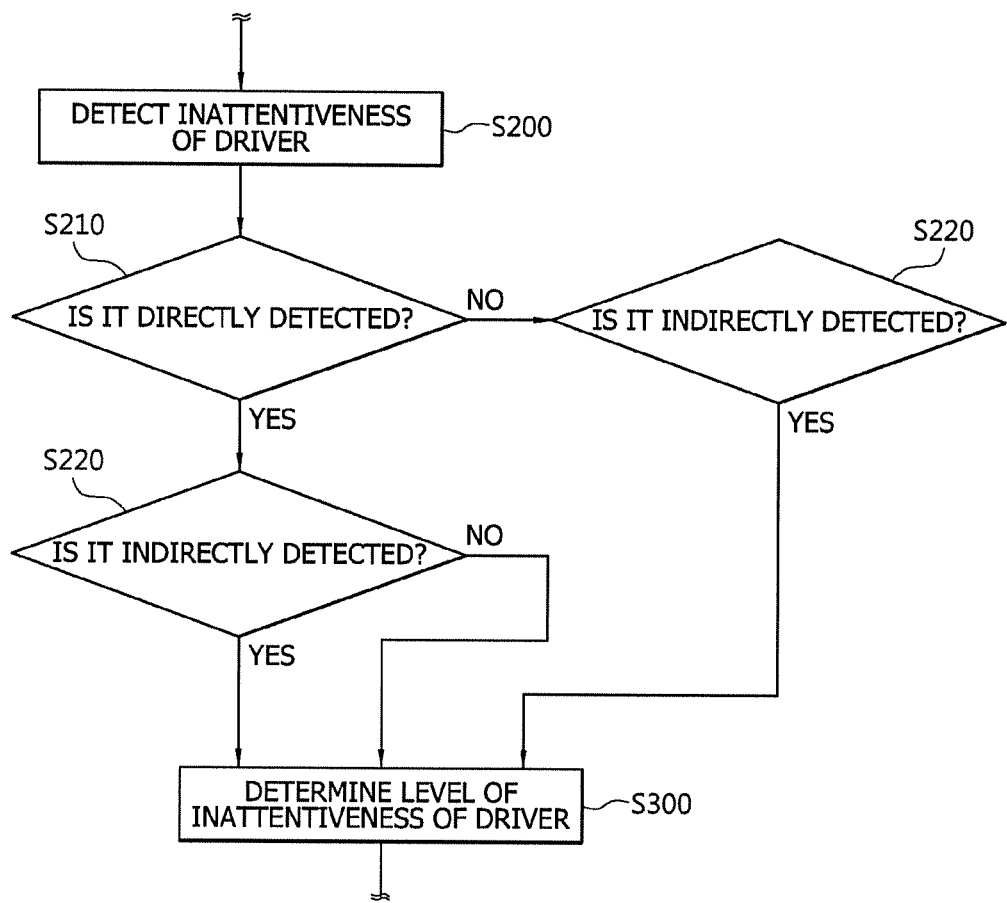
FIG. 3 is a flowchart specifically illustrating an operation in which a level of inattentiveness of a driver is determined through the emergency control device for a vehicle according to the present invention.

FIG. 1 is a block diagram of an emergency control device for a vehicle according to the present invention, FIG. 2 is a flowchart illustrating an operation of the emergency control device for a vehicle according to the present invention, and FIG. 3 is a flowchart specifically illustrating an operation in which a level of inattentiveness of a driver is determined through the emergency control device for a vehicle according to the present invention.

As illustrated in FIG. 1, the emergency control device for a vehicle according to the present invention includes a sensor 100 configured to measure an area inside or outside the vehicle, a processor 200 configured to process data collected by the sensor 100, and a controller 300 configured to control the vehicle by reflecting the data processed by the processor 200. In this case, the sensor 100 may detect whether a driver is inattentive, the processor 200 determines the level of inattentiveness of the driver according to the detected state of the driver, and the controller 300 controls the vehicle according to the level of inattentiveness of the driver.

That is, the sensor 100 detects inattentiveness of the driver such as the driver's drowsing, yawning, and behaviors other than driving, and the processor 200 determines the level of inattentiveness according to the detected state of the driver. That is, it may be determined that there is a higher danger of accident during driving as the level of inattentiveness is higher, and the controller 300 controls the vehicle according to the determined level of inattentiveness of the driver.

In this case, the sensor 100 may detect inattentiveness of the driver by directly measuring a state of the driver. That is, the sensor 100 detects inattentiveness of the driver through direct motion of the driver such as the driver's closing eyes or yawning due to drowsiness or the driver's using other devices, such as a smartphone, in the vehicle. However, it is preferable that the sensor 100 be configured to accurately detect whether the driver's inattentiveness is merely temporary motion intended by the driver or is motion irrelevant to the driver's intentions such as drowsing. To directly measure such states of the driver, a direct sensor 110 may be disposed inside the vehicle.

Alternatively, the sensor 100 may detect inattentiveness of the driver indirectly by using a traveling state of the vehicle. That is, the sensor 100 may detect inattentiveness of the driver by using a traveling state of the vehicle regardless of motion of the driver. In other words, the sensor 100 detects inattentiveness of the driver by using the amount of time or number of times in which the vehicle departs from a lane, the speed or acceleration of the vehicle, or the like. To measure such traveling states of the vehicle, an indirect sensor 120 may be disposed outside the vehicle.

In this way, the level of inattentiveness of the driver is accurately determined using various sensors 100, and the vehicle is controlled by reflecting the determined level of inattentiveness of the driver so that an occurrence of an accident during driving is effectively prevented.

In addition, the processor 200 may apply different levels of inattentiveness for the case in which inattentiveness of the driver is detected by directly measuring a state of the driver and the case in which inattentiveness of the driver is detected indirectly by using a traveling state of the vehicle.

That is, in the case in which direct motion of the driver is measured using the sensor 100 and inattentiveness of the driver is directly detected thereby, the driver is determined to be in a highly inattentive state such as drowsing, yawning, or behaviors other than driving, and thus a high level of inattentiveness is applied, and the vehicle is controlled using the controller 300.

The sensor 100 may include a driver monitoring camera 111 configured to measure motion of the driver and detect inattentiveness of the driver.

The driver monitoring camera 111 detects inattentiveness of the driver through direct motion of the driver such as the driver's closing eyes or yawning or the driver's using other devices, such as a smartphone, in the vehicle as described above.

In this case, a facial image of the driver is captured using the driver monitoring camera 111, and an inattentive state of the driver is determined using the captured facial image of the driver. In order to capture the facial image of the driver accurately even during the night as well as daytime, the facial image of the driver may be captured by irradiating the driver's face with light of a light emitting diode (LED). Although a clear facial image may be acquired when the facial image of the driver is captured using the LED, in the case in which the driver is wearing glasses, the light from the LED may be reflected due to lenses of the glasses depending on the posture of the driver and it may become difficult to determine the driver's state. Therefore, to solve this problem, LED light reflection may be minimized by mounting polarizing filters in opposite directions in a light transmitter and light receiver of the LED in order to reduce reflection of LED light due to the lenses of the glasses.

Further, conversely, in the case in which whether the vehicle keeps traveling in the same lane, a traveling pattern of the vehicle, or lateral acceleration of the vehicle is measured using the sensor 100 and inattentiveness of the driver is indirectly detected thereby, a relatively low level of inattentiveness is applied, and the vehicle is controlled using the controller 300.

The sensor 100 may include at least one of a front camera 121 configured to measure whether the vehicle keeps traveling in the same lane, a front radar 122 configured to measure the traveling pattern of the vehicle, and a vehicle dynamics sensor 123 configured to measure a lateral acceleration of the vehicle.

The front camera 121 monitors the traveling pattern of the vehicle and captures whether the vehicle keeps traveling in the same lane in order to indirectly detect whether the driver is inattentive such as taking his or her hands off the steering wheel. The front radar 122 detects inattentiveness of the drive by using the traveling pattern of the vehicle itself, and the vehicle dynamics sensor 123 detects inattentiveness of the driver by measuring a lateral acceleration or the like of the vehicle.

As described above, the processor 200 applies different levels of inattentiveness for the case in which inattentiveness of the driver is detected by directly measuring a state of the driver and the case in which inattentiveness of the driver is detected indirectly by using a traveling state of the vehicle. For example, the processor 200 is configured to apply Level 5 as the level of inattentiveness when inattentiveness of the driver is detected directly through the driver monitoring camera 111, apply Level 2 as the level of inattentiveness when inattentiveness of the driver is detected through the front camera 121, and apply Level 1 as the level of inattentiveness when inattentiveness of the driver is detected through the vehicle dynamics sensor 123. In this case, when inattentiveness of the driver is complexly detected such as when the inattentiveness of the driver is simultaneously detected both directly and indirectly, the processor 200 may be configured to apply levels of inattentiveness thereof comprehensively to cause the vehicle to be controlled and may be configured to determine that the driver is in a dangerous inattentive state when the level of inattentiveness exceeds a certain level and cause emergency control of the vehicle to be performed.

The controller 300 may control the vehicle to assist the driver when the level of inattentiveness of the driver exceeds a certain level. Particularly, when the level of inattentiveness of the driver exceeds a certain level, the controller 300 may automatically determine whether to assist the driver.

Further, the controller 300 may control driver assist conditions to be different according to the level of inattentiveness of the driver.

In this case, methods of controlling the vehicle by the controller 300 assisting the driver include warning of the vehicle's lane departure (lane departure warning), assisting the vehicle to keep traveling in the same lane (lane keeping assist), performing emergency braking of the vehicle in case of emergency (advanced emergency braking), automatically controlling the vehicle to travel at a constant speed (smart cruise control), and assisting the speed of the vehicle until it reaches a certain speed (intelligent speed assist), and the controller 300 may control the vehicle using at least one of the methods.

The controller 300 may warn the driver of a danger using vibration or sound when it is determined that the vehicle is departing from a lane due to inattentiveness of the driver. In this way, when a danger due to lane departure is detected, the controller 300 may not only warn the driver of a danger using vibration or sound, but also actively control a steering device of the vehicle.

Alternatively, the controller 300 may measure a distance between the vehicle and the vehicle ahead by using a sensor mounted on the front of the vehicle, collect information on pedestrians or surrounding obstacles, send a warning to the driver using vibration or sound when it is determined that there is a danger of a rear-end collision during traveling of the vehicle, and actively control a braking device of the vehicle to decelerate or stop the vehicle.

Alternatively, when the driver sets a desired speed through a dashboard cluster, the controller 300 may control the vehicle to keep traveling at the set speed even without operation of pedals during driving. When the vehicle ahead decelerates or stops, the controller 300 may control the braking device of the vehicle so that the distance between the vehicle and the vehicle ahead is adjusted.

Further, when the driver desires, the controller 300 may control accelerating, braking, and steering of the vehicle until the vehicle reaches a certain speed from a stop.

That is, by controlling the vehicle using various methods listed above according to the level of inattentiveness of the driver, the controller 300 may reduce the driving burden on the driver and enhance convenience of driving, thereby effectively decreasing an occurrence of an accident during driving.

In addition, the controller 300 may control the vehicle by advancing the time at which driver assist begins and increasing the degree of driver assist as the level of inattentiveness of the driver increases.

That is, according to an increase or decrease of the level of inattentiveness of the driver, when warning the driver of a lane departure using vibration or sound, the controller 300 advances the time at which warning begins and increases the intensity of vibration or volume of sound so that the warning may be given rapidly and clearly, and when controlling the steering device of the vehicle, the controller 300 advances the time at which control of the steering device begins and increases an amount of torque for control of the steering device so that it is possible to perform steering rapidly and accurately.

In addition, the controller 300 increases sensitivity in detecting pedestrians, advances the time at which warning on a collision with a pedestrian begins, and increases a braking amount during control of the braking device of the vehicle.

Further, the controller 300 is configured to automatically control the speed of the vehicle such that the distance between the vehicle and the vehicle ahead is increased and the speed of the vehicle is limited during traveling of the vehicle.

In this way, since the degree to which the driver is assisted through the driver assist environment is adjusted according to the level of inattentiveness of the driver, it is possible to perform efficient driving assist and vehicle control.

When inattentiveness of the driver is detected for a certain amount of time, the controller 300 may determine that a threshold condition has been satisfied and control the vehicle to decelerate or to decelerate and then stop. That is, a situation in which the driver is determined as being unable to drive any more is set as the threshold condition, and even in such a situation, the controller 300 controls the vehicle to safely decelerate and stop. The controller 300, may in some situations, search for a safe pull-over spot using the various sensors and set a path towards the safe pull-over spot before decelerating the vehicle such that the vehicle comes to a complete stop at the safe pull-over spot. In this way, the driver may be effectively protected.

In this case, the controller 300 may determine whether the threshold condition has been satisfied on the basis of at least one of the number of lane departures, the hands-off time, a lateral acceleration equal to or greater than a specific numerical value, a radius of curvature equal to or less than a specific numerical value, and the lane departure time.

In addition, any other condition with which whether the driver may be determined as being unable to drive any more may be set as a threshold condition, and the controller 300 may be configured to perform emergency control of the vehicle by reflecting the threshold condition.

In this way, since the vehicle may safely decelerate and stop even in the situation in which the driver is determined as being unable to drive any more, the driver may be effectively protected.

Hereinafter, an operation of the emergency control device for a vehicle according to the present invention will be described with reference to FIGS. 2 and 3.

As illustrated in FIG. 2, a driver starts a vehicle to drive the vehicle (S100), and while the vehicle travels, the sensor 100 detects inattentiveness of the driver (S200). In this case, when inattentiveness of the driver is detected through the sensor 100, the processor 200 determines the level of inattentiveness according to the state of the driver (S300).

The controller 300 determines whether the determined level of inattentiveness of the driver is a certain level or higher (S400) and controls the vehicle when the level of inattentiveness of the driver exceeds the certain level. In this case, the controller 300 checks whether the driver is currently being assisted (S500). Then, if the driver is currently being assisted, the controller 300 controls driver assist conditions (S600), and if the driver is not being assisted, the controller 300 automatically determines whether to assist the driver (S510) and then controls the driver assist conditions (S600). In this way, the controller 300 controls the vehicle (S700) while the sensor 100 continues to detect inattentiveness of the driver.

In a state in which the level of inattentiveness of the driver does not exceed the certain level, the controller 300 may check whether the driver is currently being assisted (S800) and then, if the driver is currently being assisted, control the driving assist conditions (S900) and control the vehicle (S1000). However, if the driver is not being assisted, the controller 300 determines that vehicle control is unnecessary, and keeps the state in which the driver is not assisted (S810) while the sensor 100 continues to detect inattentiveness of the driver.

While the vehicle travels, the sensor 100 detects inattentiveness of the driver (S200). As illustrated in FIG. 3, the sensor 100 may directly detect inattentiveness of the driver (S210) and then indirectly detect inattentiveness of the driver (S220) in order to detect inattentiveness of the driver, and the processor 200 may determine the level of inattentiveness of the driver according to the detected state of the driver (S300).

Alternatively, if inattentiveness of the driver is directly detected by the sensor 100 (S210) but not indirectly detected thereby, the processor 200 may determine the level of inattentiveness of the driver (S300) according to the directly detected state of the driver. Conversely, if inattentiveness of the driver is indirectly detected (S220) even when not detected directly, the processor 200 may determine the level of inattentiveness of the driver (S300) by reflecting the indirectly detected state of the driver.

The emergency control device for a vehicle of the present invention having the above configuration accurately determines a level of inattentiveness of a driver by using various sensors and controls the vehicle by reflecting the determined inattentive state of the driver so that an occurrence of an accident during driving is effectively prevented.

In addition, the emergency control device for a vehicle of the present invention adjusts a degree to which a driver is assisted through a driver assist environment according to the level of inattentiveness of the driver so that efficient driving assist and vehicle control are possible.

Further, the emergency control device for a vehicle of the present invention safely decelerates and stops the vehicle even when a driver is determined as being unable to drive any more so that the driver is effectively protected.

Embodiments of the present invention have been described above, but the idea of the present invention is not limited to the embodiments proposed herein. One of ordinary skill in the art who understands the idea of the present invention may easily propose other embodiments by adding, modifying, or deleting an element within the same scope, but such modifications should be understood as falling within the scope of the present invention.

What is claimed is:

1. A control device for a vehicle, comprising:
   a sensor mounted to the vehicle and configured to detect a state of a driver of the vehicle;
   a processor configured to determine a level of inattentiveness of the driver among a plurality of levels of inattentiveness of the driver based on the state of the driver detected by the sensor; and
   a controller configured to provide different control signals for controlling the vehicle based on different levels of inattentiveness of the driver determined by the processor,
   wherein upon determining the level of inattentiveness of the driver, the controller is configured to initiate the different control signals for controlling the vehicle with the different time delays, wherein an amount of time delay by which the different control signals are initiated is determined based on the determined level of inattentiveness of the driver.

2. The control device of claim 1, wherein the sensor includes a first sensor configured to directly detecting the state of the driver.

3. The control device of claim 2, wherein the sensor includes a second sensor configured to detect the state of the driver indirectly by detecting a traveling state of the vehicle.

4. The control device of claim 3, wherein the processor is configured to determine the level of inattentiveness of the driver based on a combination of outputs from the first and second sensors, an output from the first sensor being given relatively more weight than an output from the second sensor.

5. The control device of claim 2, wherein the first sensor is configured to detect a motion of the driver.

6. The control device of claim 3, wherein the second sensor is configured to detect whether the vehicle keeps traveling in a same lane, or detects a traveling pattern of the vehicle or a lateral acceleration of the vehicle.

7. The control device of claim 1, wherein when the level of inattentiveness of the driver exceeds a threshold level, the controller is configured to provide a control signal to the vehicle to assist the driver.

8. The control device of claim 7, wherein when the level of inattentiveness of the driver exceeds the threshold level, the controller is configured to automatically determine whether to assist the driver.

9. The control device of claim 1, wherein the controller is configured to provide a warning of a lane departure, provide a control signal to keep a lane, provide a control signal to perform emergency braking of the vehicle, provide a control signal to automatically drive the vehicle at a constant speed, or provide a control signal to control a speed of the vehicle until the speed of the vehicle reaches a preset speed depending on the level of inattentiveness of the driver.

10. The control device of claim 1, wherein the controller is configured to provide a control signal to advance a time at which driver assist begins and change a level of driver assistance as the level of inattentiveness of the driver increases.

11. The control device of claim 1, wherein, if the level inattentiveness of the driver is detected for a threshold amount of time, the controller is configured to determine that a threshold condition has been satisfied and provide a control signal to decelerate the vehicle or to decelerate and stop the vehicle.

12. The control device of claim 1, wherein the controller is configured to determine whether a threshold condition has been satisfied on the basis of at least one of a number of lane departures, a time for which the driver's hands are off a steering wheel of the vehicle, a lateral acceleration equal to or greater than a preset numerical value, a radius of curvature equal to or less than a preset numerical value, or the lane departure time, and
provide a control signal to the vehicle to decelerate or to decelerate and then stop if the threshold condition has been satisfied.

13. A control device for a vehicle comprising: a first sensor configured to detect an inside of the vehicle; a second sensor configured to detect an outside of the vehicle; a processor configured to process data detected by the first and second sensor; and a controller configured to control the vehicle based on the data processed by the processor, wherein: the first and second sensors detect whether a driver is inattentive; the processor is configured to determine a level of inattentiveness of the driver based on a combination of outputs from the first and second sensors, an output from the first sensor being given relatively more weight than an output from the second sensor; and upon determining the level of inattentiveness of the driver, the controller is configured to initiate different control signals for controlling the vehicle with different time delays, wherein an amount of time delay by which the different control signals are initiated is determined based on the determined level of inattentiveness of the driver.

14. A control device for a vehicle, comprising:
a sensor configured to detect an inside or an outside of the vehicle;
a processor configured to process data detected by the sensor; and
a controller configured to control the vehicle based on the data processed by the processor, wherein:
the sensor detects a state of a driver of the vehicle;
the processor determines a level of inattentiveness of the driver among a plurality of levels of inattentiveness of the driver, and whether the level of inattentiveness of the driver according to the detected state exceeds a threshold level, the threshold level being based on whether a threshold condition has been satisfied based on predetermined conditions of inattentiveness of the driver;
the controller initiates, upon determining the level of inattentiveness of the driver, different control signals for controlling the vehicle with different time delays, wherein an amount of time delay by which the different control signals are initiated is determined based on the determined level of inattentiveness of the driver, and
the controller controls the vehicle to decelerate or to decelerate and then stop, if the level of inattentiveness of the driver exceeds the threshold level, based on the determined level of inattentiveness.

15. The control device of claim 14, wherein the threshold condition is satisfied if inattentiveness of the driver is detected for a threshold amount of time.

16. The control device of claim 15, wherein the predetermined conditions include at least one of a number of lane departures, a time for which the driver's hands are off a steering wheel of the vehicle, a lateral acceleration equal to or greater than a specific numerical value, a radius of curvature equal to or less than a specific numerical value, or the lane departure time.

17. A control device for a vehicle comprising:
a first sensor configured to directly detect a state of a driver of the vehicle;
a second sensor configured to indirectly detect the state of the driver;
a processor configured to determine a level of inattentiveness of the driver among a plurality of levels of inattentiveness of the driver based on a combination of outputs from the first and second sensors, an output from the first sensor being given relatively more weight than an output from the second sensor; and
a controller configured to provide different control signals to the vehicle based on different levels of inattentiveness of the driver determined by the processor,
wherein upon determining the level of inattentiveness of the driver, the controller is configured to initiate the different control signals for controlling the vehicle with different time delays, wherein an amount of time delay by which the different control signals are initiated is determined based on the determined level of inattentiveness of the driver.

18. The control device of claim 17, wherein the controller is configured to provide a warning of a lane departure, provide a control signal to keep a lane, provide a control signal to perform emergency braking of the vehicle, provide a control signal to automatically drive the vehicle at a constant speed, or provide a control signal to control a speed of the vehicle until the speed of the vehicle reaches a preset speed depending on the level of inattentiveness of the driver.

19. The control device of claim 17, wherein the first sensor is configured to detect a motion of the driver.

20. The control device of claim 17, wherein the second sensor is configured to detect whether the vehicle keeps traveling in the same lane, or detects a traveling pattern of the vehicle or a lateral acceleration of the vehicle.

21. The control device of claim 17, wherein the controller is further configured to, if the detected level of inattentiveness of the driver exceeds a critical threshold, provide a control signal to:
search for a candidate stopping area,
steer the vehicle toward the candidate stopping area, and
decelerate the vehicle such that the vehicle comes to a complete stop at the candidate area.

22. The control device of claim 17, wherein the controller is configured to, if the detected level of inattentiveness exceeds a safety threshold, provide a control signal to:
turn hazard lights of the vehicle on, and
decelerate the vehicle to a constant speed.

* * * * *